(12) United States Patent
Kobayashi et al.

(10) Patent No.: US 8,277,969 B2
(45) Date of Patent: Oct. 2, 2012

(54) LITHIUM ION SECONDARY BATTERY

(75) Inventors: Kei Kobayashi, Kobe (JP); Yasuo Takano, Nishinomiya (JP); Taizou Sunano, Kobe (JP); Maruo Kamino, Kobe (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 242 days.

(21) Appl. No.: 12/890,052

(22) Filed: Sep. 24, 2010

(65) Prior Publication Data

US 2011/0076534 A1 Mar. 31, 2011

(30) Foreign Application Priority Data

Sep. 25, 2009 (JP) ................................. 2009-220113
Feb. 26, 2010 (JP) ................................. 2010-043118

(51) Int. Cl.
*H01M 2/16* (2006.01)

(52) U.S. Cl. ......... 429/135; 429/133; 429/129; 429/131

(58) Field of Classification Search .................. None
See application file for complete search history.

(56) References Cited

U.S. PATENT DOCUMENTS

| 4,476,624 | A | * | 10/1984 | Klein et al. | ................. | 29/623.1 |
| 4,902,589 | A | * | 2/1990 | Dahn et al. | ...................... | 429/94 |
| 5,989,743 | A | * | 11/1999 | Yamashita | .................... | 429/129 |
| 6,485,859 | B1 | * | 11/2002 | Szyszkowski | .................. | 429/66 |
| 2006/0093903 | A1 | * | 5/2006 | Hong et al. | .................... | 429/161 |

FOREIGN PATENT DOCUMENTS

| JP | 2003-308873 A | 10/2003 |
| JP | 2004-273153 A | 9/2004 |
| JP | 2008-243661 A | 10/2008 |

* cited by examiner

*Primary Examiner* — Cynthia Lee

(74) *Attorney, Agent, or Firm* — Westerman, Hattori, Daniels & Adrian, LLP

(57) ABSTRACT

A lithium ion secondary battery 1 includes a spirally wound electrode assembly 20 and a cylindrical battery container 10. The spirally wound electrode assembly 20 includes a negative electrode 21, a positive electrode 22 and a separator 23. The negative electrode 21 includes negative-electrode active material layers 21*b* and 21*c* containing a negative-electrode active material capable of forming an alloy with lithium. The lithium ion secondary battery 1 includes an urging part 20*a*. The urging part 20*a* is disposed in the center of and in contact with the spirally wound electrode assembly 20. The urging part 20*a* is contractible in diameter. The urging part 20*a* is configured to urge the spirally wound electrode assembly 20 radially outward at least when contracting in diameter.

22 Claims, 10 Drawing Sheets

LITHIUM ION SECONDARY BATTERY

BACKGROUND OF THE INVENTION

1. Field of the Invention

This invention relates to lithium ion secondary batteries and particularly relates to cylindrical lithium ion secondary batteries using a negative-electrode active material capable of forming an alloy with lithium.

2. Description of Related Arts

In recent years, power consumption of mobile devices including cellular phones, notebook computers and personal digital assistants (PDAs) has rapidly increased. Along with this, there has been an increasing demand to increase the capacity of lithium ion secondary batteries. However, if a graphite material, which has been widely used so far, is used as a negative-electrode active material for a lithium ion secondary battery, a problem arises in that it is difficult to sufficiently increase the capacity of the lithium ion secondary battery. In view of this problem, studies have been actively conducted on negative-electrode active materials having higher capacities than graphite materials.

Typical examples of new negative-electrode active materials currently proposed include materials capable of forming an alloy with lithium, such as silicon, germanium and tin. Among these materials, silicon, as for example described in Published Japanese Patent Application No. 2008-243661, has a high theoretical capacity of approximately 4000 mAh per gram. Therefore, much attention has been focused on silicon and silicon alloys as negative-electrode active materials that can achieve higher battery capacity.

However, negative-electrode active materials capable of forming an alloy with lithium, such as silicon, change the volume with storage and release of lithium. Therefore, if a cylindrical battery having a substantially unchanged volume is produced using a negative-electrode active material capable of forming an alloy with lithium, a volume change of the negative-electrode active material may cause a bend or the like in a central region of the spirally wound electrode assembly. If a bend or the like occurs in the electrode assembly, the separator may be damaged and the positive and negative electrodes may be electrically short-circuited.

In view of these problems, for example, Published Japanese Patent Applications Nos. 2003-308873 and 2004-273153 propose to insert a center pin into the center of the spirally wound electrode assembly. Published Japanese Patent Application No. 2003-308873 describes that the provision of such a center pin prevents the deformation of the electrode assembly, resulting in effective prevention of electrical short circuit between the positive and negative electrodes.

However, if a center pin is inserted into the center of the spirally wound electrode assembly, the space in the battery container not occupied by the battery components is reduced in volume. In other words, the allowable room for expansion of the spirally wound electrode assembly is reduced. Thus, the expansion of the spirally wound electrode assembly is prevented. As a result, the stress in the electrode assembly is increased, which may cause the separator to clog or cause the electrolytic solution to be extruded from the electrode assembly. Hence, if a center pin is inserted into the center of the spirally wound electrode assembly, a good charge/discharge characteristic may not be provided.

In order to avoid the prevention of expansion of the spirally wound electrode assembly, it can be considered, for example, to reduce the outer diameter of the center pin to prevent the center pin from coming into contact with the inner periphery of the spirally wound electrode assembly. For example, Published Japanese Patent Application No. 2003-308873 describes that the C/D ratio of the inner diameter (C) of the spirally wound electrode assembly to the outer diameter (D) of the center pin is selected to be 1:0.95 to 1:0.79.

However, if the center pin does not come into contact with the inner periphery of the spirally wound electrode assembly, the spirally wound electrode assembly may not suitably urge the center pin upon expansion of the negative-electrode active material. Thus, the center pin cannot sufficiently prevent the deformation of the spirally wound electrode assembly, resulting in electrical short circuit between the positive and negative electrodes.

SUMMARY OF THE INVENTION

The present invention has been made in view of the foregoing points. Therefore, an object of the present invention is that a cylindrical lithium ion secondary battery using a negative-electrode active material capable of forming an alloy with lithium effectively prevents electrical short circuit between the positive and negative electrodes while preventing or reducing deterioration of the charge/discharge characteristic due to expansion of the spirally wound electrode assembly.

A lithium ion secondary battery according to the present invention includes a spirally wound electrode assembly and a cylindrical battery container. The spirally wound electrode assembly includes a negative electrode, a positive electrode and a separator. The negative electrode includes a negative-electrode active material layer. The negative-electrode active material layer contains a negative-electrode active material capable of forming an alloy with lithium. The positive electrode is opposed to the negative electrode. The separator is interposed between the positive electrode and the negative electrode. The spirally wound electrode assembly is an electrode assembly spirally wound up. The battery container accommodates the spirally wound electrode assembly. The lithium ion secondary battery according to the present invention further includes an urging part. The urging part is disposed in the center of and in contact with the spirally wound electrode assembly. The urging part is contractible in diameter. The urging part is configured to urge the spirally wound electrode assembly radially outward at least when contracting in diameter.

DETAILED DESCRIPTION OF PREFERRED EXAMPLES

Hereinafter, a description will be given of an exemplary preferred embodiment of the present invention. Note that the present invention is not limited at all by the following embodiment.

FIRST EMBODIMENT

Figure 1:
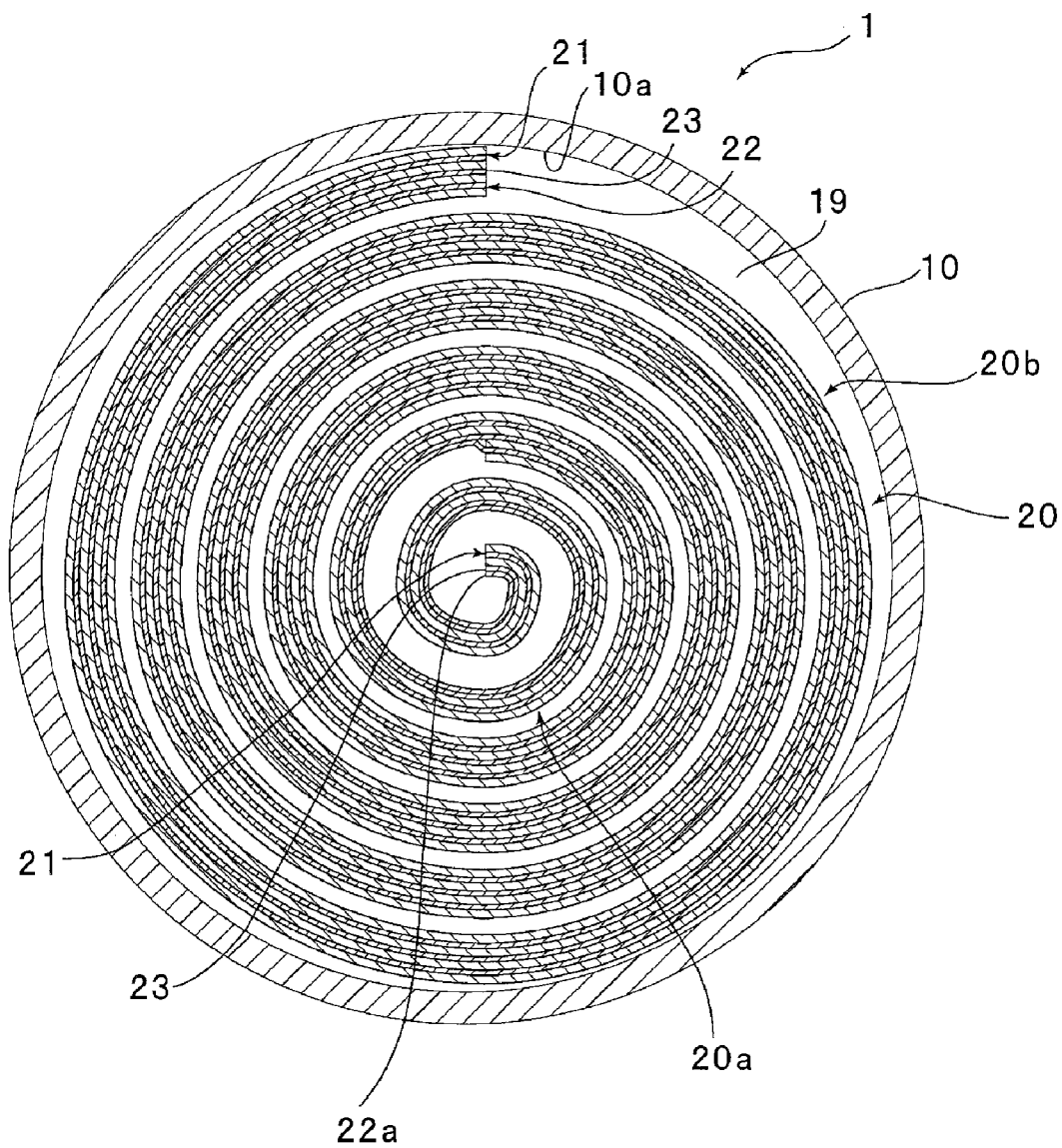
FIG. 1 is a schematic transverse cross-sectional view of a lithium ion secondary battery according to a first embodiment.

FIG. 1 is a schematic transverse cross-sectional view of a lithium ion secondary battery 1 according to this embodiment. Note that for convenience of drawing, the number of winding turns of the spirally wound electrode assembly in FIG. 1 is smaller than in reality. Furthermore, for convenience of drawing, each figure is represented as if a clearance existed between radially adjacent portions of the spirally wound electrode assembly. Actually, however, radially adjacent portions of the spirally wound electrode assembly are in contact with each other. Each figure is also represented as if a clearance also existed between the spirally wound electrode assembly and the urging part. Actually, however, the spirally wound electrode assembly and the urging part are located radially in contact with each other.

As shown in FIG. 1, the lithium ion secondary battery 1 includes a battery container 10. The battery container 10 is formed into an approximately cylindrical shape closed at the top and bottom. The interior of the battery container 10 is formed into an accommodation space 10a for accommodating a spirally wound electrode assembly 20 and other components described below. The accommodation space 10a has an approximately cylindrical shape.

From the standpoint that the lithium ion secondary battery 1 achieves high impact resistance, the battery container 10 preferably has a high rigidity and the volume of the accommodation space 10a is preferably kept substantially unchanged. Therefore, the battery container 10 is preferably made of metal. More specifically, the battery container 10 is preferably made of stainless steel, nickel, iron or aluminum. Note that the term "metal" includes alloys.

The battery container 10 is filled with a nonaqueous electrolytic solution 19. The kind of nonaqueous electrolytic solution 19 is not particularly limited. The nonaqueous electrolytic solution 19 can be appropriately selected according to the type of the lithium ion secondary battery 1 and the kinds of the negative-electrode active material and positive-electrode active material used. Generally, the nonaqueous electrolytic solution 19 consists of a nonaqueous solution obtained by dissolving a nonaqueous electrolyte in a nonaqueous solvent. Concrete examples of the nonaqueous electrolyte include lithium hexafluorophosphate ($LiPF_6$). Concrete examples of the nonaqueous solvent include ethylene carbonate (EC), 4-fluoroethylene carbonate (FEC), ethyl methyl carbonate (EMC) and their mixture solvents.

In the battery container 10, a spirally wound electrode assembly 20 is disposed while being put in the nonaqueous electrolytic solution 19. The spirally wound electrode assembly 20 is an electrode assembly spirally wound up. In other words, the spirally wound electrode assembly 20 has a scroll shape.

Figure 2:
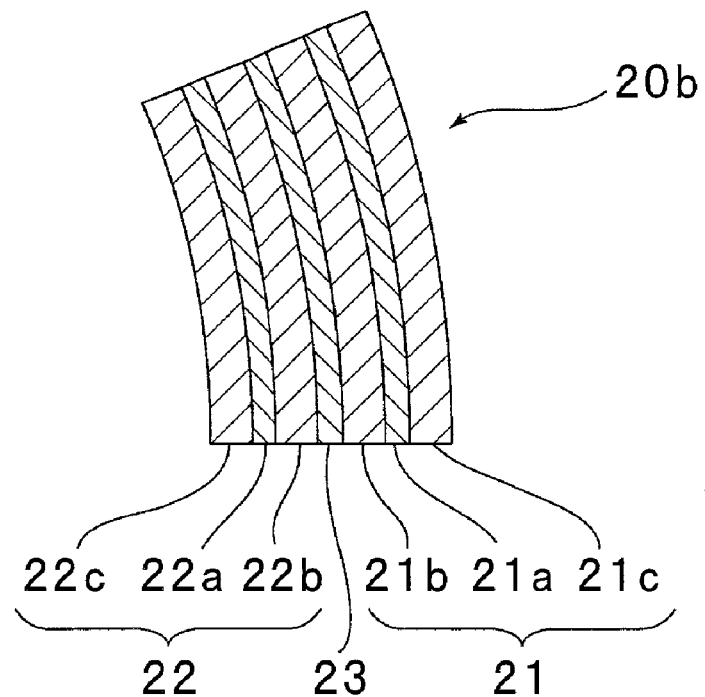
FIG. 2 is a schematic cross-sectional view partly showing a main part of a spirally wound electrode assembly.

FIG. 2 shows a schematic cross-sectional view of a main part 20b that is a part of the spirally wound electrode assembly 20 other than an urging part 20a thereof located in a central end region of the spirally wound electrode assembly 20. As shown in FIG. 2, the main part 20b includes a negative electrode 21, a positive electrode 22 and a separator 23. Each of the negative electrode 21 and the positive electrode 22 is formed in a spiral shape. The negative electrode 21 and the positive electrode 22 are opposed to each other. The separator 23 is interposed between the negative electrode 21 and the positive electrode 22. The separator 23 separates the negative electrode 21 and the positive electrode 22 from each other.

The material for the separator 23 is not particularly limited so long as it can electrically insulate the negative electrode 21 and the positive electrode 22 from each other. For example, the separator 23 can be formed of a polyethylene microporous film.

In this embodiment, the positive electrode 22 includes a positive electrode current collector 22a, and positive-electrode active material layers 22b and 22c provided on both surfaces of the positive electrode current collector 22a. Note that in the present invention the structure of the positive electrode is not particularly limited. For example, the positive electrode may be composed of a positive electrode current collector and a positive-electrode active material layer formed on one surface of the positive electrode current collector.

The material for the positive electrode current collector 22a is not particularly limited so long as it has electrical conductivity. For example, the positive electrode current collector 22a can be formed of a sheet of foil made from a metal, such as copper, nickel, iron, titanium, cobalt, manganese, tin or silicon, or an alloy of any combination of these metals. The positive electrode current collector 22a is preferably formed of a sheet of foil made from, among others, Al or an alloy containing Al as a main ingredient. The reason for this is that Al has excellent corrosion resistance.

The thickness of the positive electrode current collector 22a is not particularly limited but is preferably, for example, between about 5 μm to about 50 μm, and more preferably between about 10 μm to about 20 μm.

The positive-electrode active material layers 22b and 22c contain a positive-electrode active material. The positive-electrode active material used is not particularly limited so long as it can electrochemically insert and eliminate lithium. Examples of the positive-electrode active material include lithium-containing transition metal oxides and metal oxides containing no lithium. Concrete examples of such lithium-containing transition metal oxides include $LiCoO_2$, $LiNiO_2$, $LiMn_2O_4$, $LiMnO_2$, $LiCO_{0.5}Ni_{0.50}O_2$, and $LiNi_{0.7}CO_{0.2}Mn_{0.2}O_2$. Concrete examples of the above metal oxides containing no lithium include $MnO_2$.

The positive-electrode active material layers 22b and 22c may contain a binder, an electronic conductor or other additives if appropriate. Concrete examples of the binder include poly(vinylidene fluoride).

The negative electrode 21 includes a negative electrode current collector 21a, and negative-electrode active material layers 21b and 21c provided on both surfaces of the negative electrode current collector 21a. Note that in the present invention the structure of the negative electrode is not particularly limited so long as it includes a negative-electrode active material layer. For example, the negative electrode may be composed of a negative electrode current collector and a negative-electrode active material layer formed on one surface of the negative electrode current collector.

The material for the negative electrode current collector 21a is not particularly limited so long as it has electrical conductivity. For example, the negative electrode current collector 21a can be formed of a sheet of foil made from a metal, such as copper, nickel, iron, titanium, cobalt, manganese, tin or silicon, or an alloy of any combination of these metals. The negative electrode current collector 21a preferably contains a metal element likely to be diffused into active material particles. Therefore, the negative electrode current collector 21a is preferably formed of a sheet of foil made from, among others, Cu or an alloy containing Cu as a main ingredient.

The thickness of the negative electrode current collector 21a is not particularly limited but is preferably, for example, between about 5 μm to about 50 μm, and more preferably between about 10 μm to about 20 μm.

The negative-electrode active material layers 21b and 21c contain a negative-electrode active material. The negative-electrode active material is made of a material capable of forming an alloy with lithium. Concrete examples of the negative-electrode active material capable of forming an alloy with lithium include silicon, germanium, tin, lead, zinc, magnesium, sodium, aluminum, potassium, indium and alloys containing at least one of these metals. The preferred negative-electrode active materials among them are silicon and silicon alloys (particularly silicon alloys containing 50% by atom or more of silicon atoms) because of their large theoretical capacities per gram.

Concrete examples of such silicon alloys include solid solutions of silicon and one or more other elements, intermetallics of silicon and one or more other elements, and eutectic alloys of silicon and one or more other elements.

The negative-electrode active material layers 21b and 21c may contain a binder, an electronic conductor or other additives if appropriate. Concrete examples of the electronic conductor include conductive powders, such as conductive metal powders and conductive carbon powder.

Figure 3:
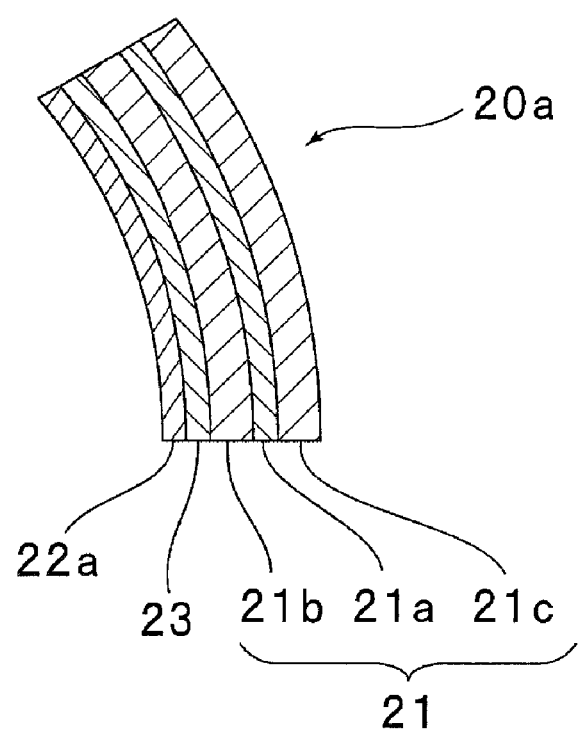
FIG. 3 is a schematic cross-sectional view partly showing an urging part of the spirally wound electrode assembly.

Next, a description will be given of the urging part 20a of the spirally wound electrode assembly 20 mainly with reference to FIG. 3. The urging part 20a includes, unlike the main part 20b, only part out of the positive electrode 22, the negative electrode 21 and the separator 23. More specifically, the urging part 20a includes at least one of the separator 23, the positive electrode current collector 22a, the negative-electrode active material layers 21b and 21c, and the negative electrode current collector 21a, but does not include the positive-electrode active material layer 22b. In other words, the urging part 20a is constituted by one of the following combinations (a) to (x). Note that FIG. 3 illustratively shows the case (a) where the urging part 20a is constituted by a combination of the negative electrode current collector 21a, the negative-electrode active material layers 21b and 21c, the positive electrode current collector 22a and the separator 23. The combinations are as follows:

(a) the negative electrode current collector 21a, the negative-electrode active material layers 21b and 21c, the positive electrode current collector 22a and the separator 23;

(b) the negative electrode current collector 21a, the negative-electrode active material layers 21b and 21c and the separator 23;

(c) the negative electrode current collector 21a, the negative-electrode active material layer 21b, the positive electrode current collector 22a and the separator 23;

(d) the negative electrode current collector 21a, the negative-electrode active material layer 21c, the positive electrode current collector 22a and the separator 23;

(e) the negative-electrode active material layers 21b and 21c, the positive electrode current collector 22a and the separator 23;

(f) the negative electrode current collector 21a, the negative-electrode active material layer 21b and the separator 23;

(g) the negative electrode current collector 21a, the negative-electrode active material layer 21c and the separator 23;

(h) the negative-electrode active material layers 21b and 21c and the separator 23;

(i) the negative electrode current collector 21a and the negative-electrode active material layers 21b and 21c;

(j) the negative electrode current collector 21a, the positive electrode current collector 22a and the separator 23;

(k) the negative-electrode active material layer 21b, the positive electrode current collector 22a and the separator 23;

(l) the negative-electrode active material layer 21c, the positive electrode current collector 22a and the separator 23;

(m) the negative electrode current collector 21a and the separator 23;

(n) the negative-electrode active material layer 21b and the separator 23;

(o) the negative-electrode active material layer 21c and the separator 23;

(p) the positive electrode current collector 22a and the separator 23;

(q) the negative electrode current collector 21a and the negative-electrode active material layer 21b;

(r) the negative electrode current collector 21a and the negative-electrode active material layer 21c;

(s) the negative electrode current collector 21a;

(t) the positive electrode current collector 22a;

(u) the separator 23;

(v) the negative-electrode active material layers 21b and 21c;

(w) the negative-electrode active material layer 21b; and (x) the negative-electrode active material layer 21c.

Figure 5:
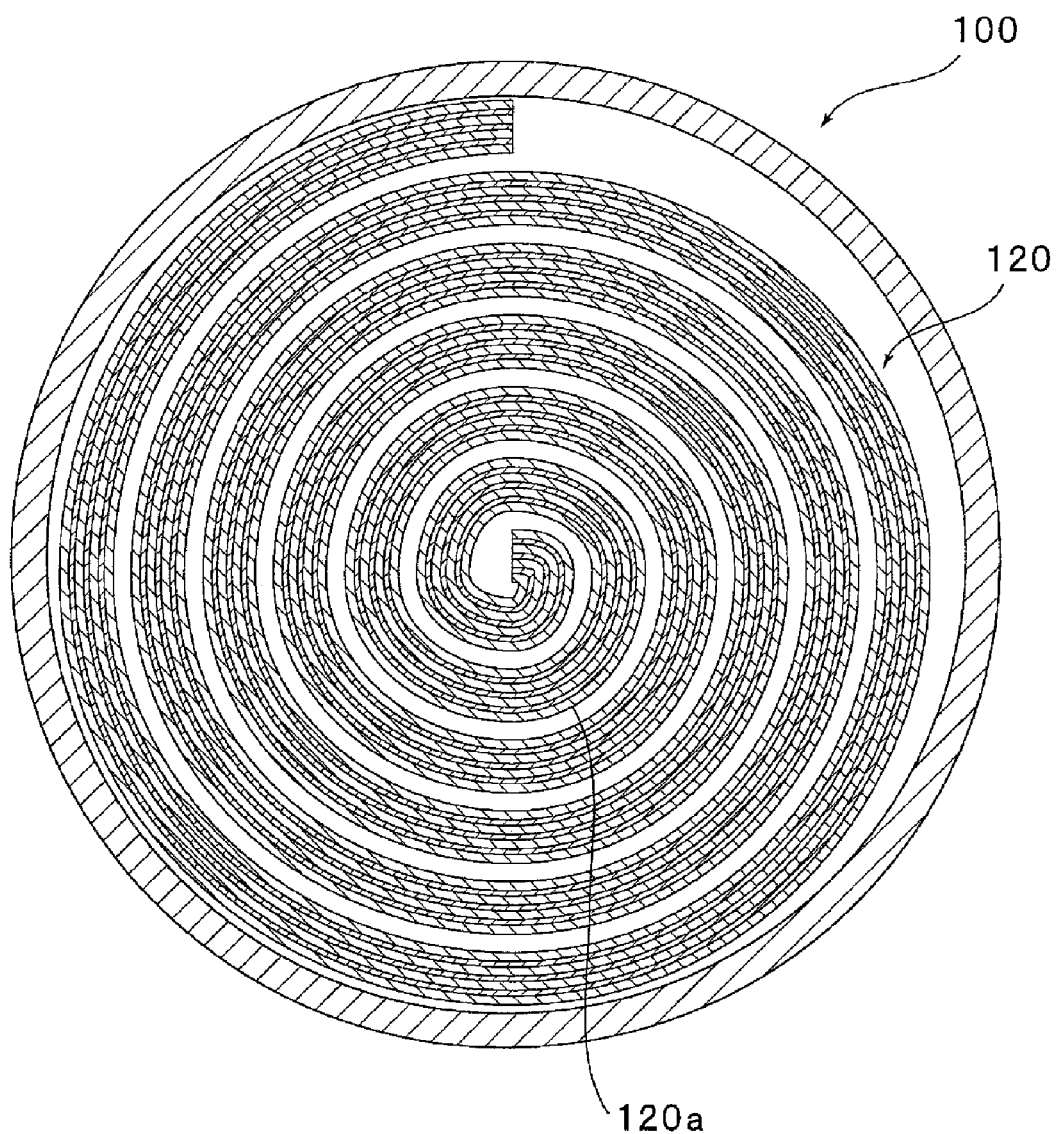
FIG. 5 is a schematic cross-sectional view of a lithium ion secondary battery according to Reference Example 1 including no urging part when a spirally wound electrode assembly is unexpanded.
Figure 6:
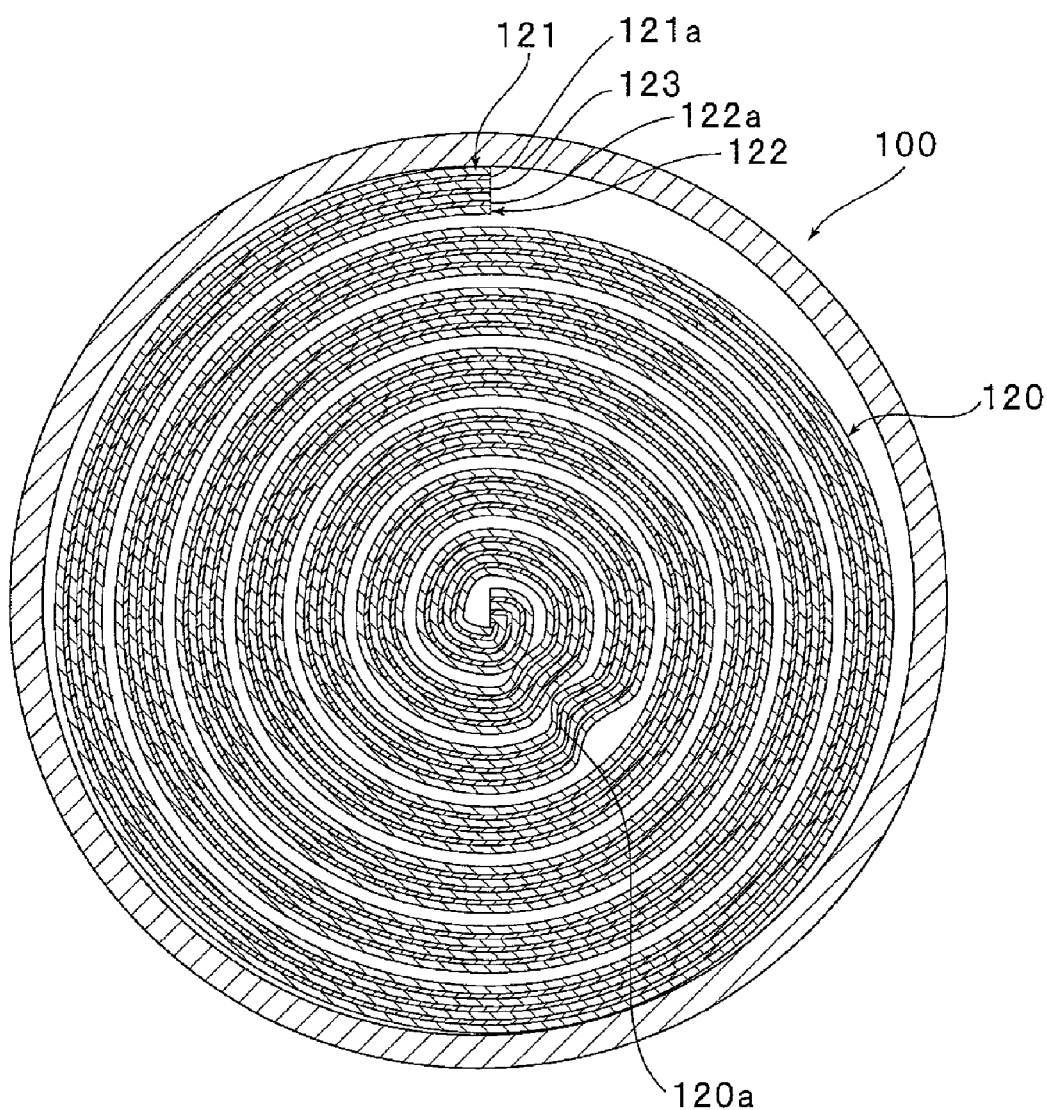
FIG. 6 is a schematic cross-sectional view of the lithium ion secondary battery according to Reference Example 1 when the spirally wound electrode assembly is expanded.

As shown in FIG. 5, for example, a lithium ion secondary battery 100 including no urging part is low in strength in the central end region 120a of the spirally wound electrode assembly 120. Therefore, as shown in FIG. 6, when the negative-electrode active material stores lithium ions to expand the spirally wound electrode assembly 120, the central end region 120a of the spirally wound electrode assembly 120 may be radially deformed. For example, the central end region 120a of the spirally wound electrode assembly 120 may be bent. If the central end region 120a is bent, the separator 123 may be damaged, for example, by the negative electrode current collector 121a or the positive electrode current collector 122a to cause electrical short circuit between the positive electrode 121 and the negative electrode 122.

Figure 7:
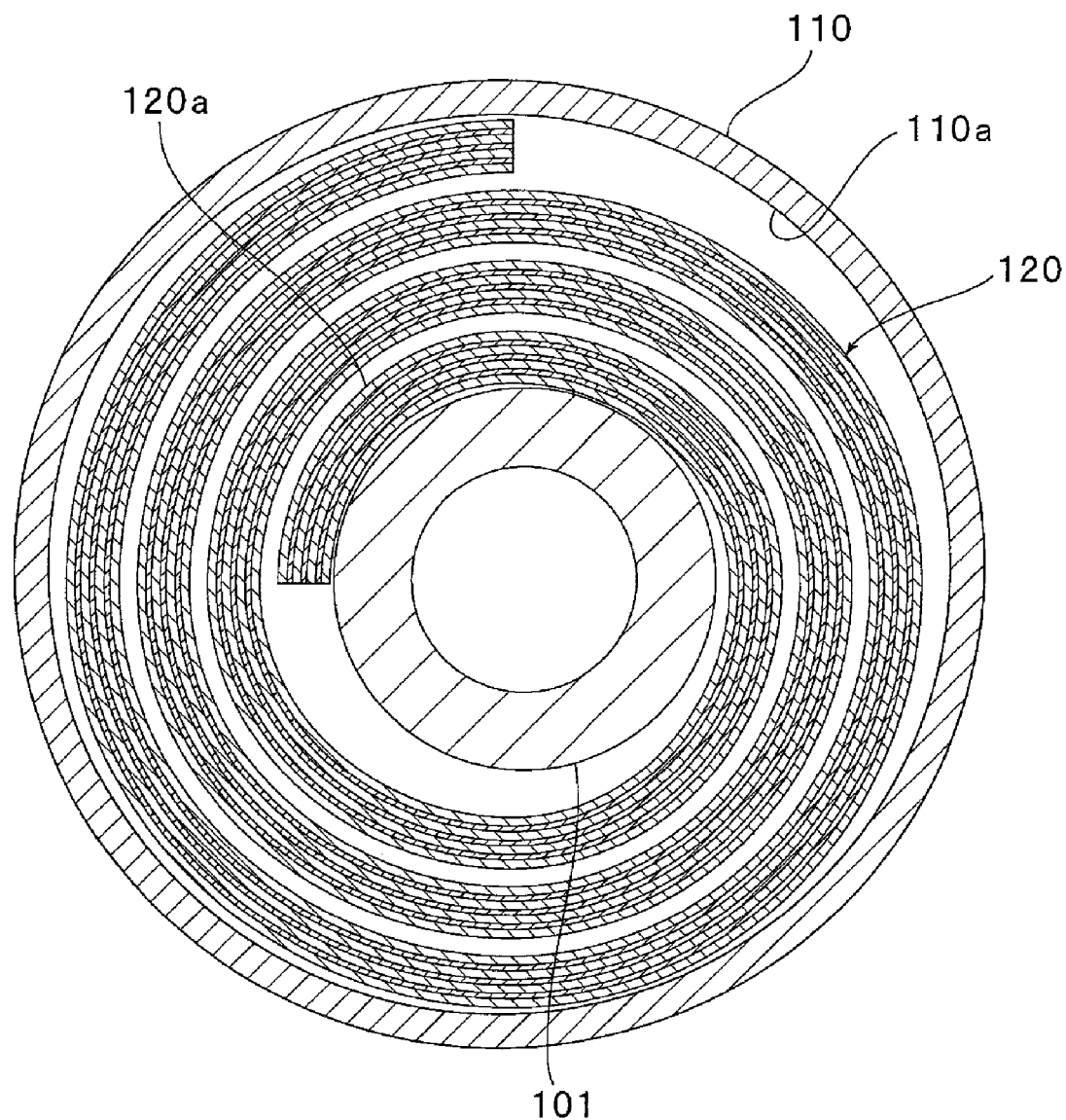
FIG. 7 is a schematic cross-sectional view of a lithium ion secondary battery according to Reference Example 2 including no urging part but including a center pin when a spirally wound electrode assembly is unexpanded.

In contrast, for example, as shown in FIG. 7, if a center pin 101 is provided in the center of the spirally wound electrode assembly 120, the center pin 101 restricts the central end region 120a of the spirally wound electrode assembly 120 from being radially deformed. This effectively prevents electrical short circuit between the negative electrode 121 and the positive electrode 122 due to deformation of the spirally wound electrode assembly 120.

Figure 8:
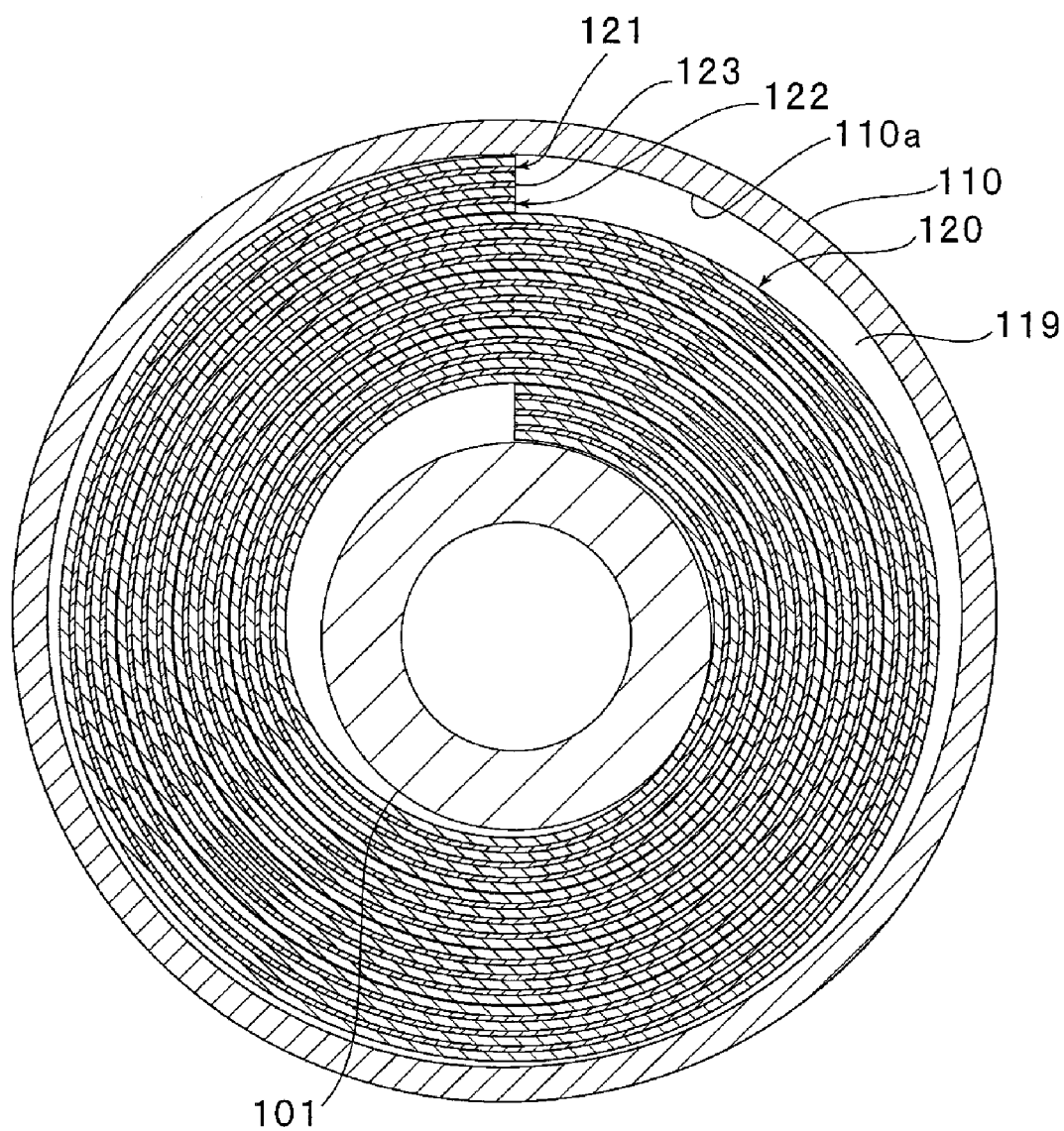
FIG. 8 is a schematic cross-sectional view of the lithium ion secondary battery according to Reference Example 2 when the spirally wound electrode assembly is expanded.

However, the provision of a center pin 101 reduces the allowable room for expansion of the spirally wound electrode assembly 120 in the accommodation space 110*a* of the battery container 110. Thus, as shown in FIG. 8, while the spirally wound electrode assembly 120 is expanded, the allowable room for its expansion in the accommodation space 110*a* will be substantially eliminated. Therefore, the center pin 101 and the battery container 110 prevent further expansion of the spirally wound electrode assembly 120. This may cause the separator 123 to clog or cause the electrolytic solution 119 to be extruded from the spirally wound electrode assembly 120. Hence, if a center pin 101 is inserted into the center of the spirally wound electrode assembly 120, a good charge/discharge characteristic may not be provided.

In this embodiment, as shown in FIG. 1, such a center pin is not provided. Furthermore, the urging part 20*a* has elasticity and a spiral shape as described previously and can therefore contract in diameter. In other words, the urging part 20*a* can elastically change the shape in the direction to reduce its radius. Furthermore, since the spirally wound electrode assembly 20 and the urging part 20*a* are radially in contact with each other, the urging part 20*a* urges the main part 20*b* of the spirally wound electrode assembly 20 radially outward at least when contracting in diameter.

Figure 4:
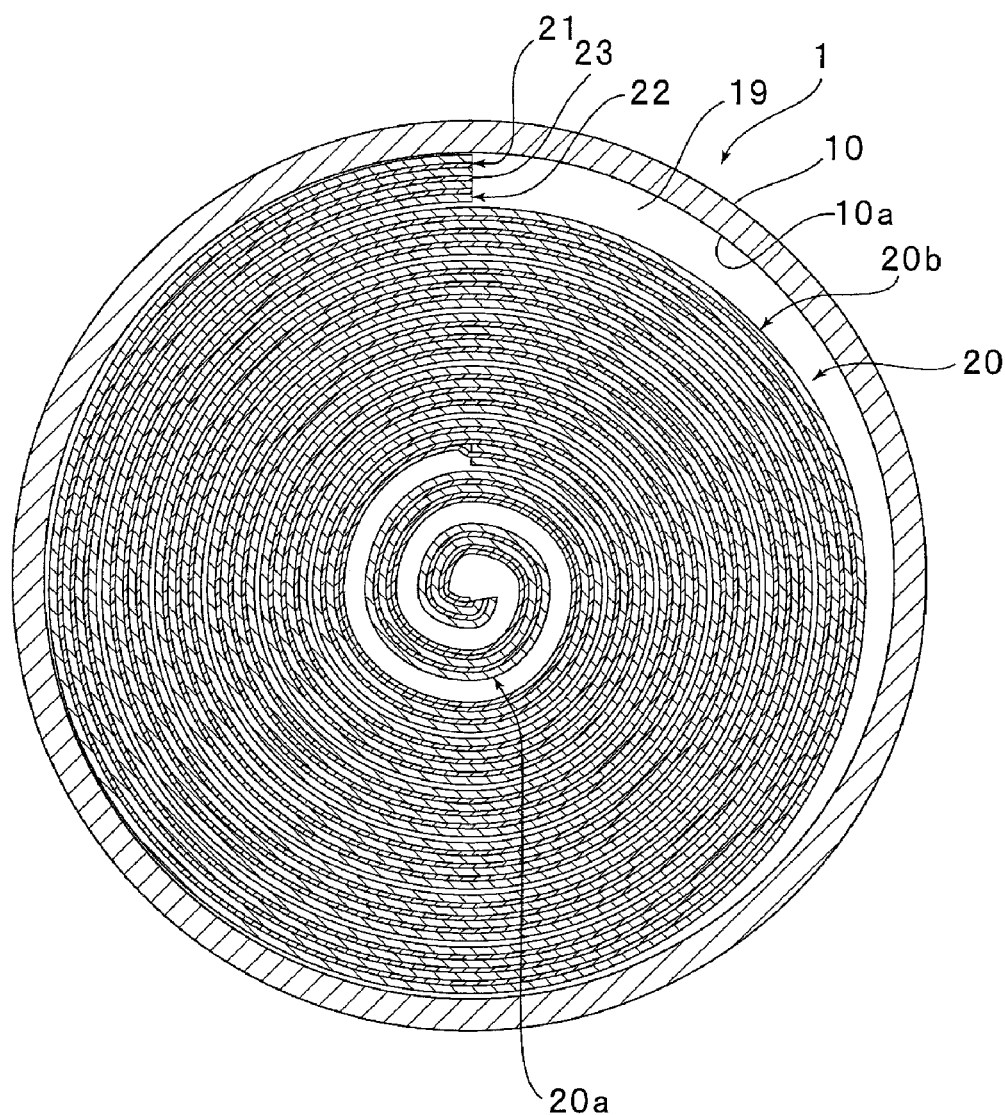
FIG. 4 is a schematic cross-sectional view of the lithium ion secondary battery when a negative-electrode active material stores lithium and the main part of the spirally wound electrode assembly is thereby expanded.

Therefore, as shown in FIG. 4, when the negative-electrode active material layers 21*b* and 21*c* store lithium and expand, the main part 20*b* changes the shape in the direction to wind forward (i.e., the direction to increase the number of winding turns). Along with this, the urging part 20*a* is also changed in shape in the direction to wind forward by the stress exerted thereon from the main part 20*b*. As a result, the urging part 20*a* contracts in diameter. Thus, an allowable room for expansion of the main part 20*b* of the spirally wound electrode assembly 20 is created in the accommodation space 10*a* of the battery container 10. Therefore, in this embodiment, the expansion of the spirally wound electrode assembly 20 is not prevented. In addition, the increase in stress in the battery container 10 can be effectively reduced. Hence, the clogging of the separator 23 and the extrusion of the electrolytic solution 19 from the spirally wound electrode assembly 20 are less likely to occur. This provides a good discharge characteristic.

Furthermore, in this embodiment, when the spirally wound electrode assembly 20 changes the shape in the direction to wind forward, the main part 20*b* is urged radially outwardly of the spirally wound electrode assembly 20 by the urging part 20*a*. Therefore, the main part 20*b* can be effectively prevented from being radially deformed when the spirally wound electrode assembly 20 changes the shape in the direction to wind forward. The main part 20*b* is smoothly displaced towards the center along the circumferential direction. Since the main part 20*b* radially changes the shape in this manner, this effectively prevents electrical short circuit between the positive electrode 22 and the negative electrode 21 due to damage to the separator 23.

As will be obvious from the description heretofore given, according to this embodiment, the electrical short circuit between the negative electrode 21 and the positive electrode 22 due to deformation of the spirally wound electrode assembly 20 can be effectively prevented, while the increase in stress in the battery container 10 can be reduced and the discharge characteristic can be thereby kept well.

The urging part 20*a* may be formed separately from the spirally wound electrode assembly 20. However, if the urging part 20*a* is formed separately from the spirally wound electrode assembly 20, the urging part 20*a* must be inserted in a diameter-contracted state into the spirally wound electrode assembly 20. This tends to complicate the assembly of the lithium ion secondary battery. In contrast, in this embodiment, the urging part 20*a* is formed integrally with the spirally wound electrode assembly 20. Therefore, by simply winding an electrode assembly, the spirally wound electrode assembly 20 including the urging part 20*a* can be easily produced. Hence, the lithium ion secondary battery can be easily manufactured.

Furthermore, in this embodiment, the urging part 20*a* does not include the positive-electrode active material layer 22*b*. Therefore, it can be effectively prevented that during charging and discharging, lithium is precipitated on the urging part 20*a*. Hence, the occurrence of electrical short circuit due to precipitation of lithium can be effectively prevented.

Expansion of the negative-electrode active material occurs whenever a material capable of forming an alloy with lithium is used as the negative-electrode active material. Therefore, the technique of this embodiment can be widely applied to lithium ion secondary batteries using a negative-electrode active material capable of forming an alloy with lithium. Particularly, if the negative-electrode active material used is silicon or a silicon alloy, it largely expands. More specifically, the volume of the negative-electrode active material having formed an alloy with lithium is 1.2 or more times as large as that before forming an alloy with lithium. Therefore, the technique of this embodiment is particularly effective if silicon or a silicon alloy is used as a negative-electrode active material.

From the standpoint of effective prevention of radial deformation of the main part 20*b* of the spirally wound electrode assembly 20, the urging part 20*a* is preferably such that it can apply a large urging force to the main part 20*b* when contracting in diameter. Specifically, the strength parameter (k/L) of the urging part 20*a* is preferably 0.05 [(N/mm)/mm] or more and more preferably 0.08 [(N/mm)/mm] or more. As used herein, the strength parameter (k/L) of the urging part 20*a* is the value obtained by dividing the elastic modulus (k) of the urging part 20*a* upon application of stress thereto in the direction of the diameter thereof by the length (L) of the urging part 20*a* along the direction of the central axis thereof.

The measurement of the strength parameter of the urging part 20*a* can be made in the following manner.

Figure 9:
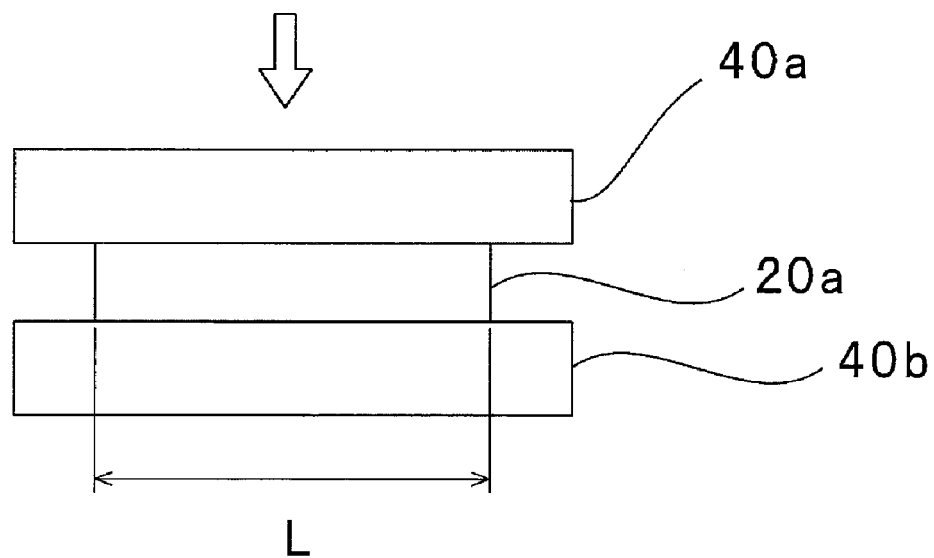
FIG. 9 is a schematic front view for illustrating a method for measuring a strength parameter.
Figure 10:
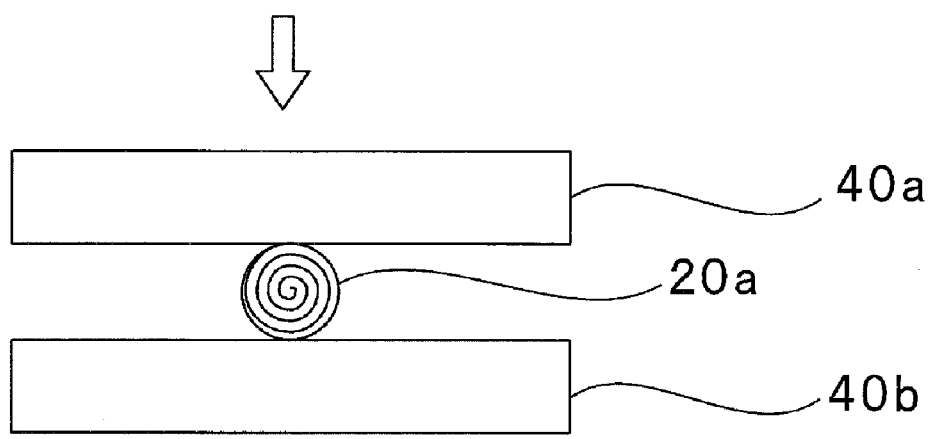
FIG. 10 is a schematic side view for illustrating the method for measuring a strength parameter.

First, as shown in FIGS. 9 and 10, the urging part 20*a* is placed between parallel-arranged two flat plates 40*a* and 40*b* made, for example, of SUS so that its central axis is parallel to the flat plates 40*a* and 40*b*. Next, the flat plate 40*a* is displaced towards the flat plate 40*b* and the stress exerted from the urging part 20*a* at this time is measured. Then, the magnitude (N/mm) of stress relative to the displacement (mm) of the flat plate 40*a* is determined. By dividing the magnitude (N/mm) of stress relative to the displacement (mm) of the flat plate 40*a* by the length (L) of the urging part 20*a* in the direction of the central axis, the strength parameter [(N/mm)/mm] can be calculated.

Furthermore, the magnitude of stress exerted on the main part 20*b* by the urging part 20*a* correlates with the number of winding turns of the urging part 20*a*. Specifically, as the number of winding turns of the urging part 20*a* increases, the magnitude of stress exerted on the main part 20*b* by the urging part 20*a* tends to increase. On the other hand, as the number of winding turns of the urging part 20*a* decreases, the magnitude of stress exerted on the main part 20*b* by the urging part 20*a* tends to decrease. Therefore, the number of winding turns of the urging part 20a is preferably one or more, more preferably three or more, and still more preferably five or more.

Furthermore, if the number of winding turns of the urging part 20a is five or more, the occurrence of bend or the like in the spirally wound electrode assembly 20 can be particularly effectively prevented by selecting the value obtained by multiplying the elastic modulus of the urging part 20a by the thickness of the urging part 20a to be 0.84 kN/mm or more. Moreover, if the number of winding turns of the urging part 20a is three or more, the occurrence of bend or the like in the spirally wound electrode assembly 20 can be particularly effectively prevented by selecting the value obtained by multiplying the elastic modulus of the urging part 20a by the thickness of the urging part 20a to be 1.49 kN/mm or more.

Thus, the larger the value obtained by multiplying the elastic modulus of the urging part 20a by the thickness of the urging part 20a, the more preferable. Therefore, the urging part 20a preferably contains at least one of the positive electrode current collector and the negative electrode current collector each having a large value obtained by multiplying the elastic modulus by the thickness.

Note that the value obtained by multiplying the elastic modulus of the urging part by the thickness thereof corresponds to the sum of the products of the elastic modulus and thickness of each component of the urging part. For example, if the urging part is constituted by a combination of the negative electrode current collector, the separator and the positive electrode current collector, the value obtained by multiplying the elastic modulus of the urging part by the thickness thereof is equal to the sum of the products of the elastic modulus and thickness of each of the negative electrode current collector, the separator and the positive electrode current collector.

The term "the number of winding turns" refers to the number of portions of the urging part or the spirally wound electrode assembly radially wrapped one upon another.

The elastic modulus ($N/mm^2$) refers to the slope of the linear region of the stress-strain curve measured according to JIS Z2241.

The urging part 20a preferably contains only one of the positive electrode current collector 22a and the negative electrode current collector 21a. According to this structure, even if, for example, a bend is produced in the urging part 20a and the separator 23 in the urging part 20a is broken, the occurrence of electrical short circuit between the positive electrode current collector 22a and the negative electrode current collector 21a can be completely avoided.

Furthermore, if the urging part 20a contains only one of the positive electrode current collector 22a and the negative electrode current collector 21a, the value obtained by multiplying the elastic modulus of the current collector contained in the urging part 20a by the thickness thereof is preferably larger than the value obtained by multiplying the elastic modulus of the current collector not contained in the urging part 20a by the thickness thereof. In this case, the urging force obtained upon change in shape of the urging part 20a can be larger. Therefore, the bend of the spirally wound electrode assembly 20 can be more effectively prevented.

Hereinafter, the present invention will be described in more detail with reference to specific examples. However, the present invention is not limited at all by the following examples, and can be embodied in various other forms appropriately modified without changing the spirit of the invention.

EXAMPLE 1

In Example 1, a cylindrical lithium ion secondary battery was produced using a negative electrode, a positive electrode and a nonaqueous electrolytic solution produced in the following manners. The produced lithium ion secondary battery was 12.8 mm in diameter and 37.7 mm in height.

[Production of Negative Electrode]

First, a negative-electrode active material was produced in the following manner. A silicon core placed in a reduction furnace was heated to 800° C. by ohmic heating. Thereafter, a gas mixture of high-purity silane gas $SiH_4$ and hydrogen gas was supplied into the reduction furnace to precipitate polycrystalline silicon on the surface of the silicon core, thereby producing a polycrystalline silicon mass. The polycrystalline silicon mass was ground and classified, thereby producing polycrystalline silicon particles having a purity of 99%. In this example, the polycrystalline silicon particles thus obtained were used as a negative-electrode active material. The crystallite size of the polycrystalline silicon particles was 32 nm. The average particle diameter of the polycrystalline silicon particles was 10 μm. The crystallite size was calculated according to the Scherrer equation by obtaining the peak half width on the silicon (111) plane by powder X-ray diffractometry. The average particle diameter was obtained by laser diffractometry.

Next, the negative-electrode active material, graphite powder serving as an electronic conductor and varnish serving as a binder were added to N-methyl-2-pyrrolidone serving as a dispersion medium and mixed to give a negative-electrode active material/electronic conductor/binder mass ratio of 100:3:8.6, thereby obtaining a negative electrode mixture slurry. The average particle diameter of the graphite powder was 3.5 μm. The varnish used was one having a molecular structure represented by the following formula (1). The glass transition temperature of the varnish was approximately 300° C. The weight-average molecular weight of the varnish was approximately 50000. Note that the varnish was a precursor of a thermoplastic polyimide resin.

(1)

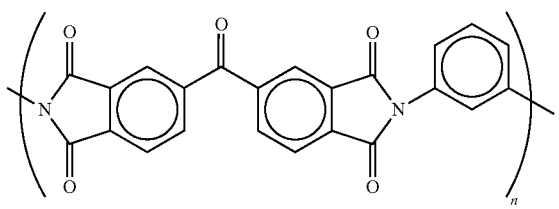

Next, a negative electrode current collector was produced. First prepared was a sheet of 18 μm thick copper alloy foil (Corson alloy foil having a composition of 96.2% by weight Cu, 3% by weight Ni, 0.65% by weight Si and 0.15% by weight Mg). Both surfaces of the sheet of copper alloy foil were roughened by electrolytic copper plating. The surface roughness Ra of the sheet of copper alloy foil after roughened was 0.25 μm, and the average peak-to-peak distance S of the surface was 0.85 μm. Note that the surface roughness Ra is defined by JIS B0601.

Next, the above negative electrode mixture slurry was applied on both surfaces of the above negative electrode current collector in an air atmosphere at 25° C. and then dried in an air atmosphere at 120° C. Thereafter, the negative electrode current collector was rolled in an air atmosphere at 25° C. and then subjected to heat treatment for 10 hours in an argon atmosphere at 400° C. Then, the obtained structural component was cut out into a 35.7 mm wide strip, and a negative electrode current collector tab made of nickel was attached to the strip, thereby producing a negative electrode. The value obtained by multiplying the elastic modulus of the negative electrode plate by the thickness thereof was 2.59 kN/mm. The value obtained likewise by multiplying the elastic modulus of the negative electrode current collector by the thickness thereof was 2.59 kN/mm.

[Production of Positive Electrode]

First, a positive-electrode active material was produced in the following manner. $Li_2CO_3$ and $CoCO_3$ were mixed using a mortar to give a Li/Co molar ratio of 1:1, subjected to heat treatment for 24 hours in an air atmosphere at 800° C. and ground, thereby preparing powder of lithium cobaltate ($LiCoO_2$). The average particle diameter of the lithium cobaltate powder was 11 μm. The BET specific surface area of the lithium cobaltate powder was 0.37 $m^2$/g.

The above positive-electrode active material, carbon material powder serving as an electronic conductor and poly(vinylidene fluoride) serving as a binder were added in a mass ratio of 95:2.5:2.5 to M-methyl-2-pyrrolidone serving as a dispersion medium and kneaded, thereby preparing a positive electrode mixture slurry. The average particle diameter of the carbon material powder used for preparation of the positive electrode mixture slurry was 2 μm.

Next, the positive electrode mixture slurry was applied on both surfaces of a positive electrode current collector, dried and rolled. The obtained component was cut out into a 33.7 mm wide strip, and a positive electrode current collector tab made of aluminum was attached to the strip, thereby producing a positive electrode. The positive electrode current collector used was formed of a sheet of 15 μm thick aluminum foil.

[Preparation of Nonaqueous Electrolytic Solution]

First, 4-fluoroethylene carbonate (FEC) and ethyl methyl carbonate (EMC) were mixed in a volume ratio of 2:8 to prepare a mixture solvent. Lithium hexafluorophosphate ($LiPF_6$) was dissolved in the mixture solvent to reach a concentration of 1.0 mol/L. Thereafter dissolved in the resultant solution was 0.4% by weight of carbon dioxide gas, thereby preparing a nonaqueous electrolytic solution.

[Production of Battery]

The positive electrode and negative electrode produced in the above manners were opposed with the separator interposed therebetween and wound up around a winding core having an outer diameter of 4 mm, and the winding core was then pulled off, thereby producing a spirally wound electrode assembly. In producing the spirally wound electrode assembly, only the negative electrode and the separator were first wound a single turn, and the negative electrode, the separator and the positive electrode were then wound up. Thus, an urging part constituted by the negative electrode and the separator was formed on the inner periphery of a main part constituted by the positive electrode, the negative electrode and the separator. The separator used was a lithium ion-permeable polyethylene microporous film having a thickness of 20 μm. The value obtained by multiplying the elastic modulus of the separator by the thickness thereof was 0.0005 kN/mm.

Next, the produced spirally wound electrode assembly was accommodated in a cylindrical battery case. Then, the positive electrode current collector tab provided on the positive electrode was connected to an external positive electrode terminal on a positive electrode cap, while the negative electrode current collector tab provided on the negative electrode was connected to the battery case. Thereafter, the above nonaqueous electrolytic solution was poured into the battery case, and the battery case was then sealed. Then, the battery case and the positive electrode cap were joined to each other through an insulating packing, thereby producing a lithium ion secondary battery.

[Evaluation]

Next, the produced lithium ion secondary battery was evaluated. First, the lithium ion secondary battery was charged at a constant current of 45 mA for four hours. Thereafter, the secondary battery was charged to a battery voltage of 4.2 V at a constant current of 180 mA. Thereafter, the secondary battery was further charged to 45 mA at a constant voltage of 4.2 V, thereby completing an initial charging. At that time, the initial charge capacity of the lithium ion secondary battery was determined.

Next, the lithium ion secondary battery after the completion of the initial charging was discharged to a battery voltage of 2.75 V at a constant current of 180 mA (initial discharging). At that time, the initial discharge capacity of the lithium ion secondary battery was determined.

Based on the above determination results, the ratio of the initial discharge capacity to the initial charge capacity was calculated as an initial efficiency. The calculation result is shown in TABLE 1 described below. Note that each initial efficiency shown in TABLE 1 is a value normalized to 100 for the initial efficiency of the lithium ion secondary battery of Comparative Example 1 described later.

Furthermore, the lithium ion secondary battery subjected to the initial charging and discharging was charged to a battery voltage of 4.2 V at a constant current of 900 mA and then further charged to a current value of 45 mA at a constant voltage of 4.2 V. Thereafter, the secondary battery was discharged to a battery voltage of 2.75 V at a constant current of 900 mA. In the case where the above constant-voltage charging and constant-current discharging consist of a single cycle of charging and discharging, 500 cycles of charging and discharging were conducted. Then, the ratio of the 500th cycle discharge capacity to the initial discharge capacity, {(500th cycle discharge capacity)/(initial discharge capacity)}, was calculated as a 500th cycle discharge capacity retention (charge/discharge characteristic). The calculation result is shown in TABLE 1 described below. Note that each discharge capacity retention shown in TABLE 1 is a value normalized to 100 for the discharge capacity retention of the lithium ion secondary battery of Comparative Example 1 described later.

Furthermore, the lithium ion secondary battery after subjected to 500 cycles of charging and discharging was observed in cross section by CT in order to check whether or not a bend was produced in the spirally wound electrode assembly. The cross-section observation was made of 20 lithium ion secondary battery samples of this example. Under the condition that a sample having a bend was defined as a defective, the percentage defective was calculated.

The calculation result is shown in TABLE 1 described below.

EXAMPLES 2 TO 4

Lithium ion secondary batteries were produced and evaluated in the same manners as in Example 1 except that the respective numbers of winding turns of their urging parts were those shown in TABLE 1.

EXAMPLES 5 TO 8

Lithium ion secondary batteries were produced and evaluated in the same manners as in Example 1 except that the respective negative electrode current collectors were made of 18 μm thick copper alloy foil (Cu—Sn alloy foil having a composition of 99.88% by weight Cu and 0.12% by weight Sn), and the respective numbers of winding turns of their urging parts were those shown in TABLE 1.

EXAMPLES 9 TO 11

Lithium ion secondary batteries were produced and evaluated in the same manners as in Example 1 except that each urging part was constituted by a positive electrode current collector and a separator and the respective numbers of winding turns of their urging parts were those shown in TABLE 1. Specifically, in Examples 9 to 11, in producing a positive electrode, positive-electrode active material layers were formed on both surfaces of a part of the positive electrode current collector excluding one longitudinal end region thereof. Then, in producing a battery, the one longitudinal end region of the positive electrode constituted only by the positive electrode current collector and the separator were first wound by the number of winding turns shown in TABLE 1. Thereafter, the rest of the positive electrode, the negative electrode and the rest of the separator were wound up together, thereby producing a spirally wound electrode assembly.

Comparative Examples 1 and 2

Lithium ion secondary batteries were produced and evaluated in the same manners as in Example 1 except that they included no urging part and the negative electrode current collectors shown in TABLE 1 were used.

Comparative Examples 3 and 4

Lithium ion secondary batteries were produced and evaluated in the same manners as in Example 1 except that they included no urging part, center pins were inserted into the centers of their respective spirally wound electrode assemblies and the negative electrode current collectors shown in TABLE 1 were used. The center pins used were cylindrical SUS rods having an outer diameter of 4 mm, a thickness of 0.5 mm and a length of 36 mm.

As shown in TABLE 1, in Comparative Examples 1 and 2 including neither center pin nor urging part, all the battery samples caused defects due to bend. In contrast, in Examples 1 to 11 including an urging part, the occurrence of defects due to bend was reduced or prevented. These results show that the formation of an urging part can reduce or prevent the occurrence of defects due to bend.

Furthermore, in Examples 1 to 8 in which a negative electrode current collector having a relatively high strength was used in the urging part, some battery samples of each of Examples 1 and 5 in which the number of winding turns in the urging part was one caused defects due to bend. In contrast, all the battery samples of Examples 2 to 4 and 6 to 8 in which the number of winding turns in the urging part was three or more caused no defect due to bend. These results show that if the number of winding turns in the urging part is three or more, this can effectively prevent the occurrence of defects due to bend. TABLE 1 also shows that if a current collector having a strength of 1.49 kN/mm or more is used to form an urging part and thereby give the urging part a strength of 1.49 kN/mm or more and the number of winding turns in the urging part is three or more, the occurrence of defects due to bend can be prevented.

Furthermore, in Examples 9 to 11 in which a positive electrode current collector having a relatively low strength was used in the urging part, some battery samples of Example 9 in which the number of winding turns in the urging part was three caused defects due to bend. In contrast, all the battery samples of Examples 10 and 11 in which the number of winding turns in the urging part was five or more caused no

TABLE 1

| | Negative Electrode Current Collector | Negative Electrode Current Collector Strength [kN/mm] | Positive Electrode Current Collector Strength [kN/mm] | Presence or Absence of Center Pin | Number of Winding Turns in Urging Part | Structure of Urging Part | Strength Parameter of Urging Part [N/mm$^2$] | Initial Efficiency (Normalized value) | Discharge Capacity Retention (Normalized value) | Percentage Defective due to Bend [%] |
|---|---|---|---|---|---|---|---|---|---|---|
| Example 1 | Corson alloy foil | 2.59 | 0.84 | Absent | 1 | Negative Electrode + Separator | 0.06 | 100 | 104 | 25 |
| Example 2 | Corson alloy foil | 2.59 | 0.84 | Absent | 3 | Negative Electrode + Separator | 0.17 | 100 | 101 | 0 |
| Example 3 | Corson alloy foil | 2.59 | 0.84 | Absent | 5 | Negative Electrode + Separator | 0.29 | 100 | 94 | 0 |
| Example 4 | Corson alloy foil | 2.59 | 0.84 | Absent | 7 | Negative Electrode + Separator | 0.39 | 100 | 99 | 0 |
| Example 5 | Cu—Sn alloy foil | 1.49 | 0.84 | Absent | 1 | Negative Electrode + Separator | 0.03 | 100 | 102 | 75 |
| Example 6 | Cu—Sn alloy foil | 1.49 | 0.84 | Absent | 3 | Negative Electrode + Separator | 0.08 | 100 | 96 | 0 |
| Example 7 | Cu—Sn alloy foil | 1.49 | 0.84 | Absent | 5 | Negative Electrode + Separator | 0.14 | 100 | 106 | 0 |
| Example 8 | Cu—Sn alloy foil | 1.49 | 0.84 | Absent | 7 | Negative Electrode + Separator | 0.19 | 100 | 103 | 0 |
| Example 9 | Cu—Sn alloy foil | 1.49 | 0.84 | Absent | 3 | Positive Electrode Current Collector + Separator | 0.05 | 100 | 99 | 25 |
| Example 10 | Cu—Sn alloy foil | 1.49 | 0.84 | Absent | 5 | Positive Electrode Current Collector + Separator | 0.08 | 100 | 100 | 0 |
| Example 11 | Cu—Sn alloy foil | 1.49 | 0.84 | Absent | 7 | Positive Electrode Current Collector + Separator | 0.12 | 100 | 103 | 0 |
| Comp. Example 1 | Corson alloy foil | 2.59 | 0.84 | Absent | 0 | — | — | 100 | 100 | 100 |
| Comp. Example 2 | Cu—Sn alloy foil | 1.49 | 0.84 | Absent | 0 | — | — | 100 | 98 | 100 |
| Comp. Example 3 | Corson alloy foil | 2.59 | 0.84 | Present | 0 | — | — | 95 | 58 | 0 |
| Comp. Example 4 | Cu—Sn alloy foil | 1.49 | 0.84 | Present | 0 | — | — | 95 | 69 | 0 | defect due to bend. These results show that if the number of winding turns in the urging part is five or more even if the current collector forming the urging part has a low strength, this can effectively prevent the occurrence of defects due to bend. TABLE 1 also shows that if a current collector having a strength of 0.84 kN/mm or more is used to form an urging part and thereby give the urging part a strength of 0.84 kN/mm or more and the number of winding turns in the urging part is five or more, the occurrence of defects due to bend can be prevented.

In terms of strength parameter of urging part, Example 5 whose urging part had a strength parameter of below 0.05 [N/mm$^2$] exhibited a high percentage defective due to bend of 75%. In contrast, Examples 1 to 4 and 6 to 11 whose urging parts had strength parameters of 0.05 [N/mm$^2$] or more exhibited low percentage defectives due to bend of 25% or less regardless of the material for the negative electrode current collector and the kind of current collector used in the urging part. These results show that if the strength parameter of the urging part is 0.05 [N/mm$^2$] or more, this can effectively reduce or prevent the occurrence of defects due to bend.

Even in Examples 1 to 4 and 6 to 11, some battery samples of Examples 1 and 9 whose urging parts have strength parameters of not less than 0.05 [N/mm$^2$] but less than 0.08 [N/mm$^2$] caused defects due to bend. In contrast, all the battery samples of Examples 2 to 4, 6 to 8, 10 and 11 whose urging parts have strength parameters of 0.08 [N/mm$^2$] or more caused no defect due to bend. These results show that if the strength parameter of the urging part is 0.08 [N/mm$^2$] or more, this can more effectively prevent the occurrence of defects due to bend.

In terms of percentage defective due to bend, Comparative Examples 3 and 4 in which a center pin was inserted into the spirally wound electrode assembly also exhibited an excellent percentage defective due to bend of 0%. However, in terms of discharge capacity retention (charge/discharge characteristic), Comparative Examples 3 and 4 exhibited low levels of below 70, whereas Examples 1 to 11 exhibited high levels of above 90. These results show that the provision of a center pin makes it difficult to provide high cycle characteristics.

The results show that in contrast, Examples 1 to 11 including not a center pin but an urging part can effectively reduce or prevent the occurrence of defects due to bend while maintaining high discharge capacity retention (charge/discharge characteristic).

EXAMPLE 12

Figure 11:
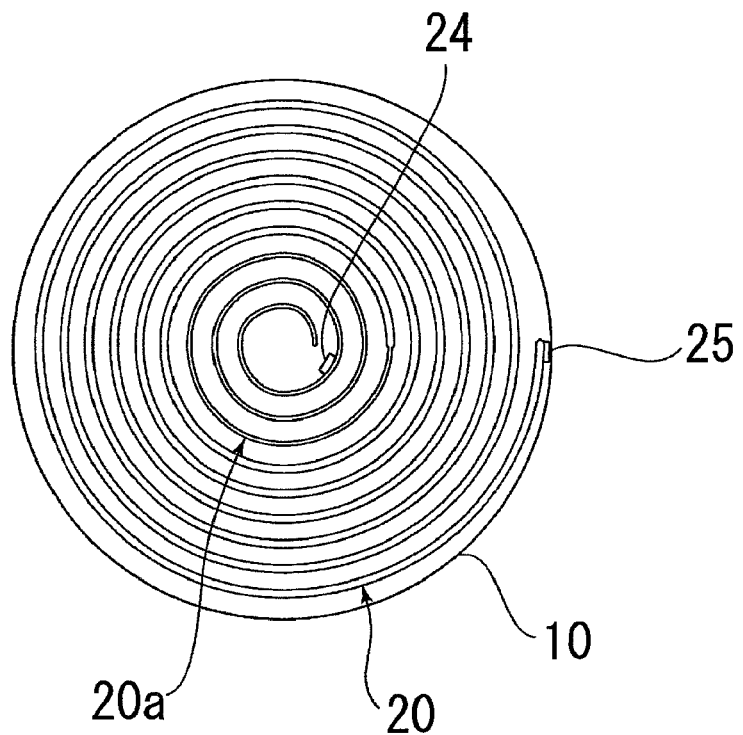
FIG. 11 is a schematic cross-sectional view of a lithium ion secondary battery produced in Example 12.

In Example 12, a lithium ion secondary battery was produced and evaluated in the same manners as in Example 2 except that the urging part 20*a* was constituted by the negative electrode current collector 21*a*, the positive electrode current collector 22*a* and the separator 23. The results are shown in TABLE 2 described below. In this example, as shown in FIG. 11, the negative electrode tab 25 was joined to the outside end of the spirally wound electrode assembly 20, and the positive electrode tab 24 was joined to the inside surface of the innermost portion of the urging part 20*a*.

EXAMPLE 13

Figure 12:
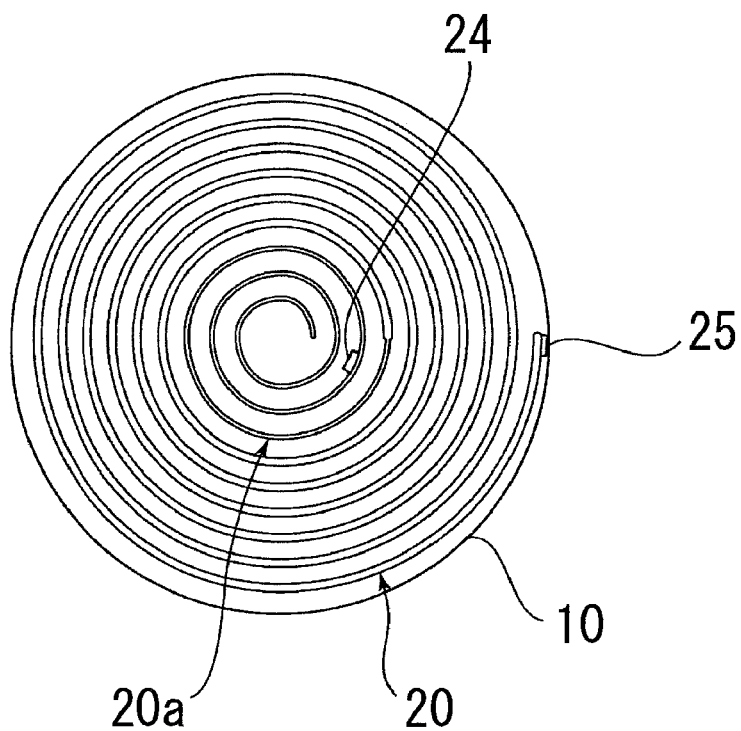
FIG. 12 is a schematic cross-sectional view of a lithium ion secondary battery produced in Example 13.

In Example 13, a lithium ion secondary battery was produced and evaluated in the same manners as in Example 12 except that as shown in FIG. 12, the positive electrode tab 24 was joined to the inside surface of the second turn of the urging part 20*a*. The results are shown in TABLE 2 described below.

EXAMPLE 14

Figure 13:
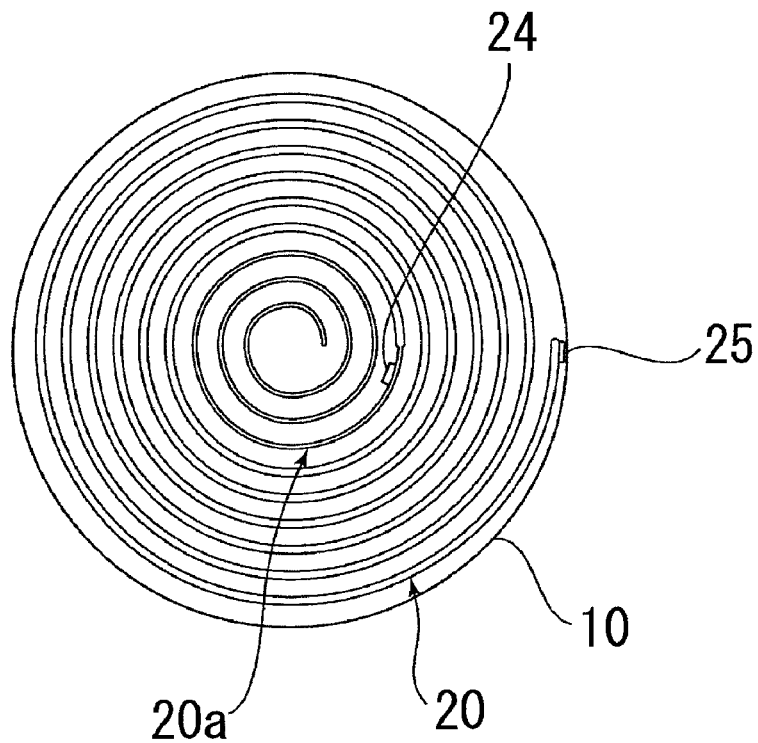
FIG. 13 is a schematic cross-sectional view of a lithium ion secondary battery produced in Example 14.

In Example 14, a lithium ion secondary battery was produced and evaluated in the same manners as in Example 12 except that as shown in FIG. 13, the positive electrode tab 24 was joined to the inside surface of the third turn of the urging part 20*a*. The results are shown in TABLE 2 described below.

EXAMPLE 15

Figure 14:
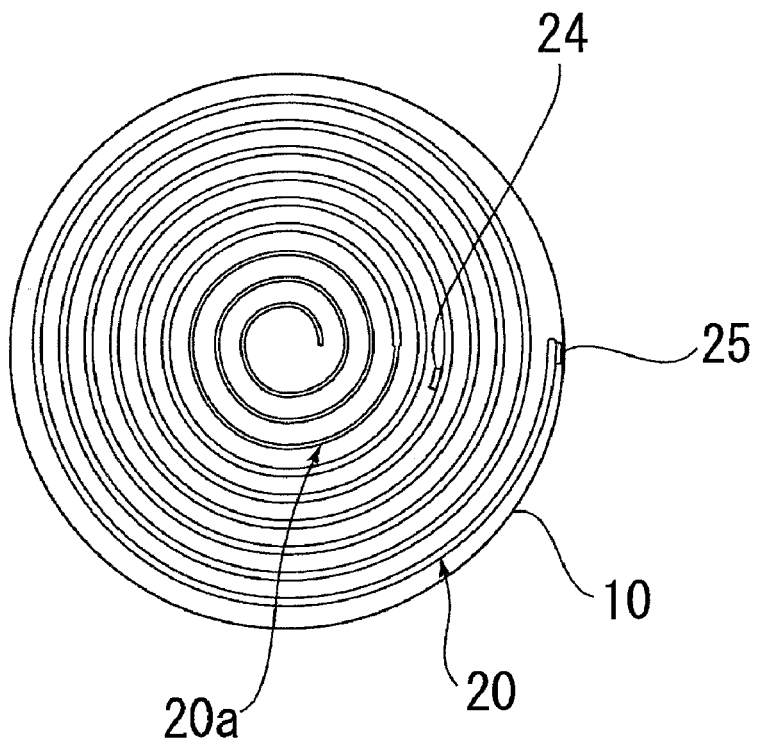
FIG. 14 is a schematic cross-sectional view of a lithium ion secondary battery produced in Example 15.

In Example 15, a lithium ion secondary battery was produced and evaluated in the same manners as in Example 12 except that as shown in FIG. 14, the positive electrode tab 24 was joined to the inside surface of the spirally wound electrode assembly 20. The results are shown in TABLE 2 described below.

TABLE 2

| | Negative Electrode Current Collector | Negative Electrode Current Collector Strength [kN/mm] | Positive Electrode Current Collector Strength [kN/mm] | Urging Part Strength [kN/mm] | Presence or Absence of Center Pin | Number of Winding Turns in Urging Part | Structure of Urging Part |
|---|---|---|---|---|---|---|---|
| Example 12 | Cu—Sn alloy foil | 1.49 | 0.84 | 2.33 | Absent | 3 | Negative Electrode Current Collector + Positive Electrode Current Collector + Separator |
| Example 13 | Cu—Sn alloy foil | 1.49 | 0.84 | 2.33 | Absent | 3 | Negative Electrode Current Collector + Positive Electrode Current Collector + Separator |
| Example 14 | Cu—Sn alloy foil | 1.49 | 0.84 | 2.33 | Absent | 3 | Negative Electrode Current Collector + Positive Electrode Current Collector + Separator |
| Example 15 | Cu—Sn alloy foil | 1.49 | 0.84 | 2.33 | Absent | 3 | Negative Electrode Current Collector + Positive Electrode Current Collector + Separator |

TABLE 2-continued

|  | Strength Parameter of Urging Part [N/mm²] | Initial Efficiency (Normalized value) | Discharge Capacity Retention (Normalized value) | Percentage Defective due to Bend [%] |
|---|---|---|---|---|
| Example 12 | 0.14 | 99 | 100 | 0 |
| Example 13 | 0.14 | 98 | 93 | 0 |
| Example 14 | 0.14 | 92 | 95 | 0 |
| Example 15 | 0.14 | 100 | 100 | 0 |

As shown in TABLE 2, Examples 12 and 15 in which the positive electrode tab 24 was joined to the positive electrode at the innermost portion of the urging part or the spirally wound electrode assembly 20 exhibited higher initial efficiencies and discharge capacity retentions than Examples 13 and 14 in which the positive electrode tab 24 was joined to the positive electrode at the second or third turn of the urging part. These results show that if the tab is connected to the positive electrode at the innermost portion of the urging part or the spirally wound electrode assembly, the contraction in diameter of the urging part is less likely to be prevented by the tab, which provides a more excellent charge/discharge characteristic.

Note that although in Examples 12 to 15 the positive and negative electrodes are joined to a single positive electrode tab and a single negative electrode tab, respectively, the number of tabs joined to each electrode is not limited to this. For example, negative electrode tabs may be joined to the outside end of the spirally wound electrode assembly and the inside surface of the innermost portion of the urging part, while a positive electrode tab may be joined to the inside surface of the spirally wound electrode assembly. Specifically, it can be assumed that even if at least either a plurality of positive electrode tabs are joined to the positive electrode or a plurality of negative electrode tabs are joined to the negative electrode as described above, the contraction in diameter of the urging part is less likely to be prevented by the tabs, which provides a more excellent charge/discharge characteristic.

Note that "the innermost portion of the urging part" means a portion which is located innermost of the urging part and radially inwardly of which the urging part no longer exists.

What is claimed is:

1. A lithium ion secondary battery comprising:
a spirally wound electrode assembly including (a) a negative electrode comprising a negative-electrode active material layer containing a negative-electrode active material capable of forming an alloy with lithium, (b) a positive electrode opposed to the negative electrode, and (c) a separator interposed between the positive electrode and the negative electrode;
a cylindrical battery container accommodating the spirally wound electrode assembly; and
an urging part disposed in the center of and in contact with the spirally wound electrode assembly, wherein the urging part is contractible in diameter and is configured to urge the spirally wound electrode assembly radially outward at least when contracting in diameter.

2. The lithium ion secondary battery according to claim 1, wherein the volume of the negative-electrode active material having formed an alloy with lithium is 1.2 or more times as large as that before forming an alloy with lithium.

3. The lithium ion secondary battery according to claim 1, wherein the negative electrode further comprises a negative electrode current collector on a surface of which the negative-electrode active material layer is provided,
the positive electrode comprises a positive electrode current collector, and a positive-electrode active material layer provided on the positive electrode current collector, and
the urging part is constituted by a component disposed in the center of the spirally wound electrode assembly, containing at least one of the separator, the positive electrode current collector, the negative-electrode active material layer and the negative electrode current collector, but not containing the positive-electrode active material layer.

4. The lithium ion secondary battery according to claim 3, wherein the urging part contains at least one of the positive electrode current collector and the negative electrode current collector.

5. The lithium ion secondary battery according to claim 4, wherein the urging part contains only one of the positive electrode current collector and the negative electrode current collector.

6. The lithium ion secondary battery according to claim 3, wherein the urging part contains the separator and at least one of the positive electrode current collector and the negative electrode current collector.

7. The lithium ion secondary battery according to claim 1, further comprising a positive electrode tab joined to the positive electrode, and a negative electrode tab joined to the negative electrode,
wherein the positive electrode tab and the negative electrode tab are joined to the positive electrode and the negative electrode, respectively, at an innermost portion of the urging part or the spirally wound electrode assembly.

8. The lithium ion secondary battery according to claim 7, wherein one of the positive electrode tab and the negative electrode tab is joined at the spirally wound electrode assembly to an associated one of the positive electrode and the negative electrode, and the other of the positive electrode tab and the negative electrode tab is joined at the innermost portion of the urging part to the other of the positive electrode and the negative electrode.

9. The lithium ion secondary battery according to claim 8, wherein the other of the positive electrode tab and the negative electrode tab is joined at the inside surface of the innermost portion of the urging part to the other of the positive electrode and the negative electrode.

10. The lithium ion secondary battery according to claim 7, wherein the positive electrode tab and the negative electrode tab are joined at the spirally wound electrode assembly to the positive electrode and the negative electrode, respectively.

11. The lithium ion secondary battery according to claim 5, wherein the value obtained by multiplying the elastic modulus of one of the positive electrode current collector and the negative electrode current collector contained in the urging part by the thickness thereof is larger than the value obtained by multiplying the elastic modulus of the other current collector by the thickness thereof.

12. The lithium ion secondary battery according to claim 1, wherein a cylindrical center pin is not provided in the center of the spirally wound electrode assembly.

13. The lithium ion secondary battery according to claim 1, wherein the strength parameter (k/L) of the urging part obtained by dividing the elastic modulus (k) of the urging part upon application of stress thereto in a direction of the diameter thereof by the length (L) of the urging part along a direction of the central axis thereof is 0.05 [(N/mm)/mm] or more.

14. The lithium ion secondary battery according to claim 13, wherein the strength parameter (k/L) of the urging part is 0.08 [(N/mm)/mm] or more.

15. The lithium ion secondary battery according to claim 1, wherein the number of winding turns in the urging part is three or more.

16. The lithium ion secondary battery according to claim 15, wherein the value obtained by multiplying the elastic modulus of the urging part by the thickness of the urging part is 1.49 kN/mm or more.

17. The lithium ion secondary battery according to claim 15, wherein the number of winding turns in the urging part is five or more.

18. The lithium ion secondary battery according to claim 17, wherein the value obtained by multiplying the elastic modulus of the urging part by the thickness of the urging part is 0.84 kN/mm or more.

19. The lithium ion secondary battery according to claim 1, wherein the positive electrode current collector is made of Al or an Al alloy containing Al as a main ingredient.

20. The lithium ion secondary battery according to claim 1, wherein the negative electrode current collector is made of Cu or a Cu alloy containing Cu as a main ingredient.

21. The lithium ion secondary battery according to claim 1, wherein the negative-electrode active material is silicon or a silicon alloy containing silicon as a main ingredient.

22. The lithium ion secondary battery according to claim 1, wherein the battery container is made of metal.

* * * * *